US012566137B2

(12) United States Patent
Perre et al.

(10) Patent No.: US 12,566,137 B2
(45) Date of Patent: Mar. 3, 2026

(54) FACILITY FOR DETECTING AT LEAST ONE CHARACTERISTIC PARAMETER OF A MEDIUM, AND METHOD FOR DETECTING AT LEAST ONE SUCH CHARACTERISTIC PARAMETER

(71) Applicants: CENTRALESUPELEC, Gif-sur-Yvette (FR); UNIVERSITE DE LORRAINE, Nancy (FR)

(72) Inventors: Patrick Perre, Palaiseau (FR); Ninel Kokanyan, Valmunster (FR); Cédric Guérin, Reims (FR); Mahamadou Mounkaila, Bazancourt (FR); Emilie Michiels, Prunay (FR); Victor Pozzobon, Rethel (FR)

(73) Assignees: CENTRALESUPELEC, Gif-sur-Yvette (FR); UNIVERSITE DE LORRAINE, Nancy (FR)

( * ) Notice: Subject to any disclaimer, the term of this patent is extended or adjusted under 35 U.S.C. 154(b) by 224 days.

(21) Appl. No.: 18/559,164

(22) PCT Filed: May 2, 2022

(86) PCT No.: PCT/EP2022/061727
§ 371 (c)(1),
(2) Date: Nov. 6, 2023

(87) PCT Pub. No.: WO2022/233796
PCT Pub. Date: Nov. 10, 2022

(65) Prior Publication Data
US 2024/0230538 A1    Jul. 11, 2024

(30) Foreign Application Priority Data
May 4, 2021    (FR) ...................................... 2104703

(51) Int. Cl.
*G01N 21/65* (2006.01)
*G01N 21/31* (2006.01)

(52) U.S. Cl.
CPC ............. *G01N 21/65* (2013.01); *G01N 21/31* (2013.01); *G01N 2021/3155* (2013.01); *G01N 2201/061* (2013.01)

(58) Field of Classification Search
CPC ................... G01N 21/65; G01N 21/31; G01N 2021/3155; G01N 2201/061; G01N 2021/8528; G01N 21/8507
See application file for complete search history.

(56) References Cited

U.S. PATENT DOCUMENTS

2004/0077075 A1* 4/2004 Jensen ................... C12M 23/16
                                              435/297.5
2004/0201835 A1* 10/2004 Coates ............... G01N 21/8507
                                              356/73

(Continued)

FOREIGN PATENT DOCUMENTS

GB        2516297 A      1/2015
WO    WO-2014082957 A1 * 6/2014    ......... G01N 21/8507
WO        2020075548 A1   4/2020

OTHER PUBLICATIONS

English Translation of Chauchard et al. (WO 2014/082957 A1) Description (Year: 2014).*
International Search Report and Written Opinion dated Jun. 28, 2022 in corresponding application No. PCT/EP2022/061727; w/English partial translation and partial machine translation (total 16 pages).

*Primary Examiner* — Tarifur R Chowdhury
*Assistant Examiner* — Akbar H. Rizvi
(74) *Attorney, Agent, or Firm* — Seckel IP, PLLC

(57) ABSTRACT

The facility for detecting at least one characteristic parameter of a medium (M), has A DEVICE (3) illuminating the medium (M) with a visible polychromatic light, a device (4) exciting the medium (M) with a visible-light or infrared monochromatic radiation, a first device (5) collecting and (Continued)

conveying at least a first electromagnetic radiation emitted by the medium (M), a second device (6) collecting and conveying at least a second electromagnetic radiation emitted by the medium (M), at least one visible-band spectrometer (7) obtaining at least one visible-band spectrum of the medium (M) from the at least first electromagnetic radiation, at least one Raman spectrometer (8) obtaining at least one Raman spectrum of the medium (M) from the at least second electromagnetic radiation, and a device (9) detecting the at least one characteristic parameter from the at least one visible-band spectrum and the at least one Raman spectrum.

22 Claims, 5 Drawing Sheets

(56) References Cited

U.S. PATENT DOCUMENTS

| | | | |
|---|---|---|---|
| 2007/0077657 A1* | 4/2007 | Carlson | B01J 19/0046 |
| | | | 436/4 |
| 2009/0021724 A1* | 1/2009 | Mahadevan-Jansen | ..................... |
| | | | G01N 21/65 |
| | | | 356/73 |
| 2012/0099102 A1 | 4/2012 | Bello | |
| 2016/0025633 A1* | 1/2016 | Moretto | G01J 3/44 |
| | | | 435/34 |
| 2016/0178530 A1 | 6/2016 | Davies et al. | |
| 2019/0187048 A1* | 6/2019 | Wood | G01N 21/65 |
| 2021/0381976 A1 | 12/2021 | Ikehara | |

* cited by examiner

10

31/41

311/411

312/412

FACILITY FOR DETECTING AT LEAST ONE CHARACTERISTIC PARAMETER OF A MEDIUM, AND METHOD FOR DETECTING AT LEAST ONE SUCH CHARACTERISTIC PARAMETER

The invention relates to a facility for detecting at least one characteristic parameter of a medium. The invention also relates to a method for detecting at least one such characteristic parameter of such a medium, this method being implemented by said facility.

The present invention relates to the field of manufacturing devices making it possible to detect, or even quantify, a characteristic parameter of a medium, such as a substance or a state of such a substance, within such a medium, in particular inside a reaction medium within which a biological, chemical or biochemical process is occurring.

Chemometric facilities such as Raman spectrometers are already known that make it possible to detect at least one molecule, or even to measure a content level of such a molecule, inside a medium, more particularly inside a reaction medium.

Such a Raman spectrometer has a first drawback linked to the overall fluorescence of the Raman signal. This overall fluorescence depends on the nature of the compounds present in the medium and is superimposed on the Raman spectrum of the compounds of interest that it is desired to detect or quantify. It follows that the Raman spectrum of these compounds of interest is concealed, which harms the accuracy of the measurement and prevents identification and appropriate quantification of the compounds of interest.

Another disadvantage of such a Raman spectrometer is that the presence of microorganisms generates a Mie scattering which disrupts the signal and alters the measurement, in particular the concentration. This drawback is amplified by the fact that, in a reaction medium, the concentration, the diameter and the geometry of the microorganisms evolve, which leads to a change in the Mie scattering and, consequently, a change in the disruption of the signal.

The present invention seeks to remedy the drawbacks of the facilities of the state of the art.

To this end, the invention relates to a facility for detecting at least one characteristic parameter of a medium. This facility comprises:

at least one container intended to contain the medium;

illumination means that are configured to illuminate the medium with visible polychromatic light;

excitation means which are configured to excite the medium with a visible-light or infrared monochromatic radiation;

first collection and conveying means that are configured to collect and convey at least a first electromagnetic radiation emitted by the medium as well as second collection and conveying means that are configured to collect and convey at least a second electromagnetic radiation emitted by the medium;

at least one visible-band spectrometer, which is connected to said first collection and conveying means, and which is configured to obtain at least one visible-band spectrum of the medium from said at least one first electromagnetic radiation;

at least one Raman spectrometer, which is connected to said second collection and conveying means, and which is configured to obtain at least one Raman spectrum of the medium from said at least one second electromagnetic radiation;

means for detecting said at least one characteristic parameter of the medium, from said at least one visible-band spectrum of the medium and from said at least one Raman spectrum of the medium.

According to another feature, the illumination means and the excitation means comprise, on the one hand, at least one source of visible polychromatic light configured to emit at least one visible polychromatic light and at least one source of visible-light or infrared monochromatic radiation configured to emit at least one visible-light or infrared monochromatic radiation, respectively, and, on the other hand, means for illuminating and means for exciting, respectively, the medium along at least two different optical paths.

Alternatively or (and preferably) additionally, said first collection and conveying means and said second collection and conveying means, comprise means for collecting said at least one first electromagnetic radiation and means for collecting said at least one second electromagnetic radiation, respectively, along at least two different optical paths.

In fact, these means for illuminating, exciting or collecting along at least two different optical paths comprise means for illuminating, exciting or collecting, either according to at least two different illumination, excitation or collection angles of incidence, or with at least two different illumination, excitation or collection foci.

According to another feature, the detection means comprise, on the one hand, a database that contains a plurality of reference visible-band spectra and a plurality of reference Raman spectra and, on the other hand, processing means which are configured to process, simultaneously, said at least one visible-band spectrum of the medium and said at least one Raman spectrum of the medium as a function of the plurality of visible-band spectra and the plurality of reference Raman spectra of the database, in order to obtain said at least one characteristic parameter of the medium.

The invention relates to a facility for detecting at least one characteristic parameter of a medium. This method is implemented by a facility that has the features described above and comprises the steps of:

illuminating the medium with visible polychromatic light;

exciting the medium with visible-light or infrared monochromatic radiation;

collecting and conveying at least a first electromagnetic radiation emitted by the medium;

collecting and conveying at least a second electromagnetic radiation emitted by the medium;

obtaining at least one visible-band spectrum of the medium from said at least one first electromagnetic radiation;

obtaining at least one Raman spectrum of the medium from said at least one second electromagnetic radiation;

detecting said at least one characteristic parameter of the medium, from said at least one visible-band spectrum of the medium and from said at least one Raman spectrum of the medium.

According to another feature, the step of illuminating and of exciting the medium with visible polychromatic light and with visible-light or infrared monochromatic radiation, respectively, comprises a step of illuminating and of exciting, respectively, the medium along at least two different optical paths.

Alternatively or (and preferably) additionally, the step of collecting and conveying at least a first electromagnetic radiation and of collecting and conveying at least a second electromagnetic radiation, emitted by the medium comprises a step of collecting at least a first electromagnetic radiation and of collecting at least a second electromagnetic radiation, respectively, along at least two different optical paths.

Thus, the invention relates to a facility for detecting at least one characteristic parameter of a medium. This facility comprises means for illuminating the medium with visible polychromatic light, means for exciting the medium with visible-light or infrared monochromatic radiation, at least one visible-band spectrometer to obtain at least one visible-band spectrum from at least one first electromagnetic radiation emitted by the medium and collected, and also at least one Raman spectrometer in order to obtain at least one Raman spectrum from at least one second electromagnetic radiation emitted by the medium and collected and also, means for detecting said at least one characteristic parameter of the medium, based on said at least one visible-band spectrum of the medium and on said at least one Raman spectrum of the medium.

This facility then advantageously makes it possible to obtain multispectral information that makes it possible to remedy the drawbacks encountered when only Raman spectroscopy is used.

In particular, this multispectral information makes it possible to access the attenuation of the signal due to the Mie scattering linked to the presence of microorganisms and, thus, to correct the Raman signal of the Mie scattering, which makes it possible to carry out reliable measurements despite the change in the optical behavior of the population of microorganisms.

In addition, this multispectral information makes it possible to access an overall indicator of the state of the microorganisms in a medium, which advantageously makes it possible to monitor a culture of these microorganisms in that medium.

The facility also comprises means for illuminating, exciting and/or collecting along at least two different optical paths. These means advantageously make it possible to multiply the collected spectra and to obtain complementary information on the characteristic parameter of the medium that is sought.

More particularly, when the illumination, excitation and/or collection along at least two optical paths is carried out according to at least two different illumination, excitation or collection angles of incidence, it is advantageously possible to access a characteristic parameter consisting of the count (population density) of the microorganisms in the medium (and thus to follow a culture of these microorganisms in this medium) as well as to follow the behavior of these microorganisms, in particular with respect to Mie scattering.

When the illumination, excitation and/or collection along at least two optical paths is carried out with at least two different illumination, excitation or collection foci, it is advantageously possible to obtain information on a plurality of measurement volumes of the medium.

Further objects and advantages of the present invention will become apparent throughout the following description relating to embodiments which are provided only as indicative and non-limiting examples.

The understanding of this description will be facilitated by reference to the attached drawings in which.

Figure 1:
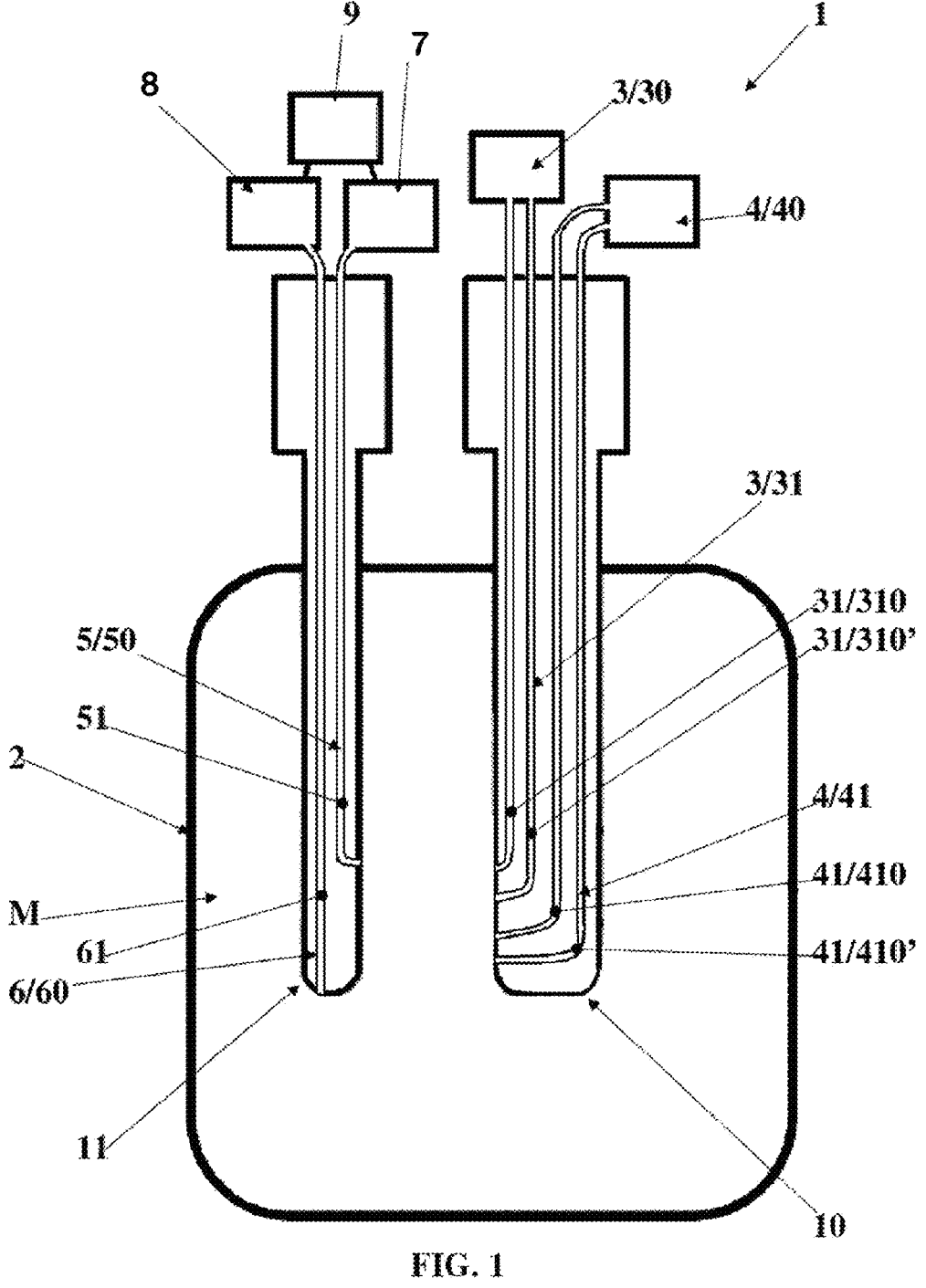
FIG. 1 is a schematic view of a facility, which is according to the invention, and which comprises an illumination and/or excitation probe comprising means for illuminating and/or exciting the medium according to at least two different illumination and/or excitation angles of incidence in accordance with a first embodiment.

The present invention relates to the field of manufacturing devices making it possible to detect, or even quantify, a characteristic parameter of a medium, such as a substance or a state of such a substance, within such a medium, in particular inside a reaction medium within which a biological, chemical or biochemical process is occurring.

The invention then relates to a facility 1 for detecting at least one characteristic parameter of a medium M. In fact, this detection facility 1 is, more particularly, configured to detect at least one characteristic parameter of a reaction medium M within which a biological, chemical or biochemical process is occurring.

This detection facility 1 then comprises a container 2 intended to contain said medium M.

This detection facility 1 also comprises illumination means 3 which are configured to illuminate the medium M with visible polychromatic light.

In this respect, it should be observed that such a visible polychromatic light corresponds to the part of the electromagnetic spectrum that is visible to the human eye.

These illumination means 3 then comprise at least one source of visible polychromatic light 30 which is configured to emit at least visible polychromatic light. Such a source of visible polychromatic light may comprise at least one light-emitting diode, preferably a wide-spectrum diode.

Alternatively, or (and preferably) additionally, said detection facility 1 comprises excitation means 4 which are configured to excite the medium M with visible-light or infrared monochromatic radiation.

These excitation means 4 comprise at least one source of visible-light or infrared monochromatic radiation 40 which is configured to emit at least one visible-light or infrared monochromatic radiation.

According to a particular embodiment, such a source of visible-light or infrared monochromatic radiation 40 is configured to emit at least one monochromatic infrared radiation whose wavelength is, preferably, situated in the near-infrared. Such a wavelength advantageously makes it possible to limit the fluorescence of a Raman signal.

Good results are obtained for wavelengths of 933 nm and 785 nm without the present invention being limited thereto.

Such a source of visible-light or infrared monochromatic radiation 40 may comprise at least one laser, in particular at least one laser diode.

The detection facility 1 also comprises first collection and conveying means 5 which are configured to collect and convey at least a first electromagnetic radiation emitted by the medium M. These first collection and conveying means 5 are, more particularly, configured to collect and convey at least a first electromagnetic radiation corresponding to a visible polychromatic light emitted by the medium M, under the effect of the illumination of this medium M by the illumination means 3.

Alternatively, or (and preferably) additionally, this detection facility 1 comprises second collection and conveying means 6 which are configured to collect and convey at least a second electromagnetic radiation emitted by the medium M. These second collection and conveying means 6 are, more particularly, configured to collect and convey at least a second electromagnetic radiation corresponding to radiation (more particularly a visible-light or infrared monochromatic radiation, in particular in the near-infrared) emitted by the medium M, under the effect of the excitation of this medium M by the excitation means 4.

Said detection facility 1 also comprises at least one visible-band spectrometer 7, which is connected to said first collection and conveying means 5, and which is configured to obtain at least one visible-band spectrum of the medium M from said at least one first electromagnetic radiation, more particularly collected and conveyed by said first collection and conveying means 5.

Alternatively, or (and preferably) additionally, said detection facility 1 comprises at least one Raman spectrometer 8, which is connected to said second collection and conveying means 6, and which is configured to obtain at least one Raman spectrum from said at least one second electromagnetic radiation, more particularly collected and conveyed by said second collection and conveying means 6.

Furthermore, said detection facility 1 comprises means 9 for detecting said at least one characteristic parameter, from said at least one visible-band spectrum of the medium M and from said at least one Raman spectrum of the medium M.

As mentioned above, said detection facility 1 comprises illumination means 3 which are configured to illuminate the medium M with visible polychromatic light.

These illumination means 3 can then also comprise means for illuminating 31 the medium M along at least two different optical paths.

In this respect, it will be noted that, according to a first type of embodiment, the means for illuminating 31 the medium M along at least two different optical paths comprise means for illuminating 31 the medium M according to at least two different illumination angles of incidence.

According to a first embodiment of this first type of embodiment shown in FIG. 1, such means for illuminating 31 the medium M along at least two different illumination angles of incidence comprise at least two conveying elements (310, 310'), on the one hand, which are configured to convey said at least one visible polychromatic light (emitted by said at least one source of visible polychromatic light 30) and, on the other hand, which are arranged to illuminate the medium M with said at least one visible polychromatic light along at least two different illumination angles of incidence.

In fact, said at least two conveying elements (310, 310') can adopt at least two different positions and/or at least two different orientations.

Figure 2:
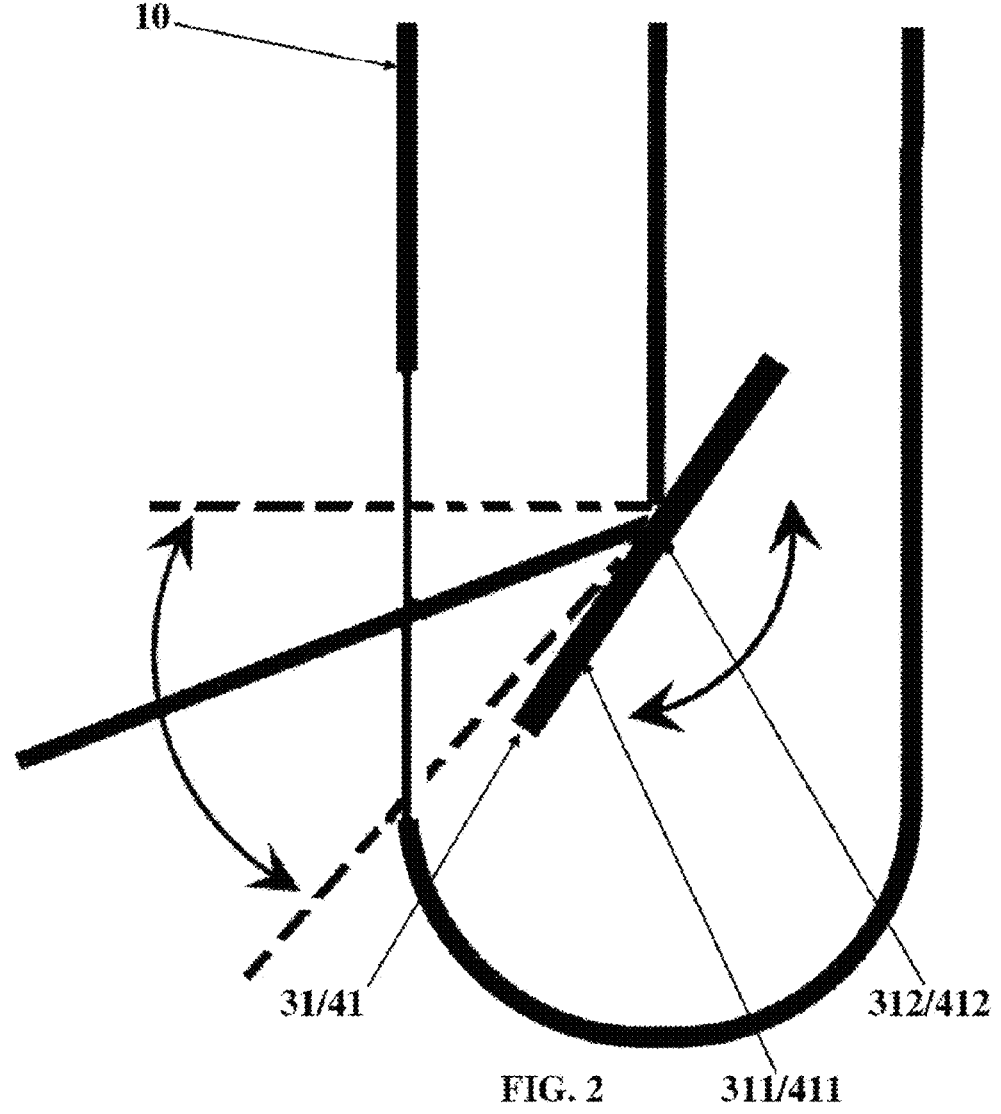
FIG. 2 is a schematic, partial cross-sectional view of an illumination and/or excitation probe comprised in the facility according to the invention, and which comprises means for illuminating and/or exciting the medium according to at least two different illumination and/or excitation angles of incidence in accordance with a second embodiment.

According to a second embodiment of this first type of embodiment shown in FIG. 2, the means for illuminating 31 the medium M along at least two different illumination angles of incidence comprise, on the one hand, at least one reflection means 311 which is configured to reflect said at least one visible polychromatic light (emitted by said at least one source of visible polychromatic light 30) in the direction of the medium M and, on the other hand, furthermore, positioning means 312 which are configured to position said at least one reflection means 311 in at least two different positions. Such a positioning in at least two different positions then allows the medium M to be illuminated along at least two different illumination angles of incidence.

Figure 3:
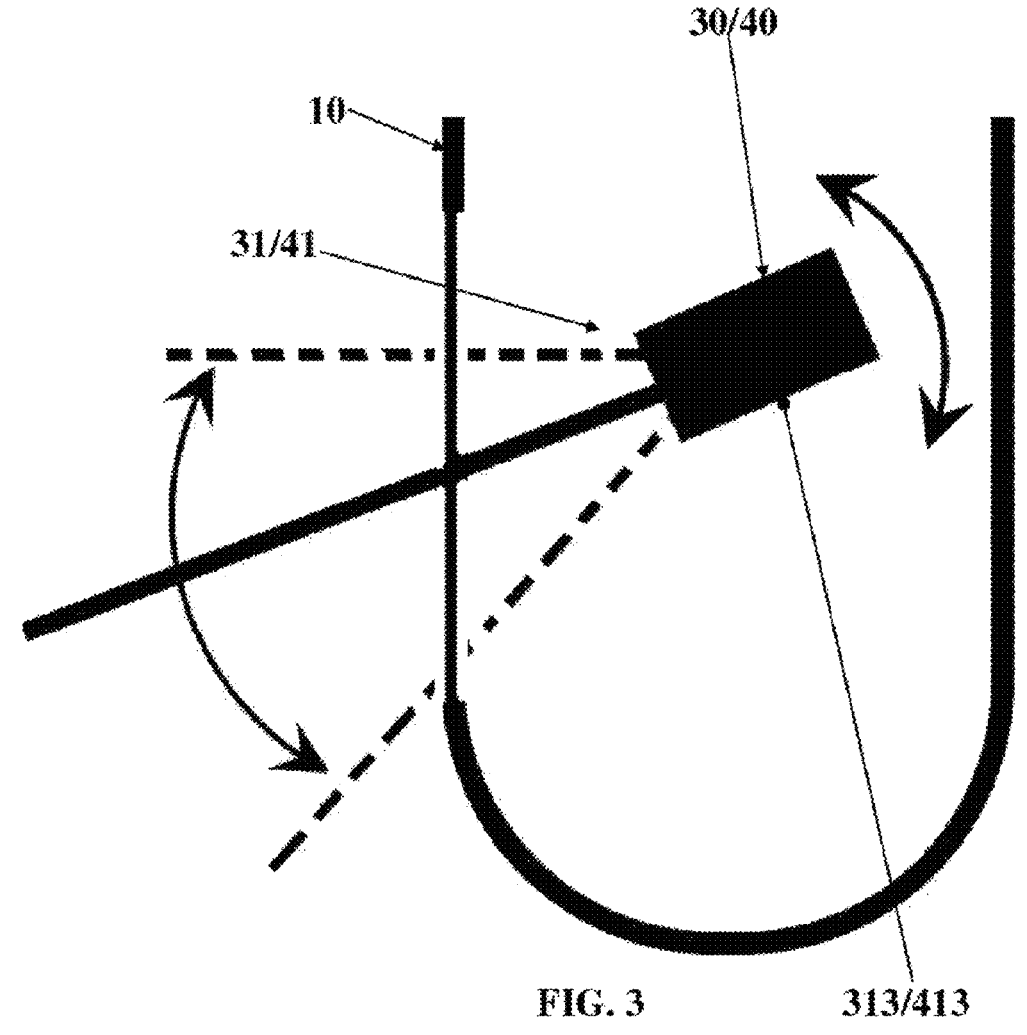
FIG. 3 is a view similar to FIG. 2 and corresponds to an illumination and/or excitation probe comprised in the facility according to the invention, and which comprises means for illuminating and/or exciting the medium according to at least two different illumination and/or excitation angles of incidence in accordance with a second embodiment.

According to a third embodiment of this first embodiment shown in FIG. 3, the means for illuminating 31 the medium M along at least two different illumination angles of incidence comprise positioning means 313 which are configured to position said at least one source of visible polychromatic light 30, in at least two different positions. Once again, such a positioning in at least two different positions then allows the medium M to be illuminated along at least two different illumination angles of incidence.

Such positioning means (312; 313) advantageously make it possible to substantially increase the number of optical illumination paths.

It will be noted that the positioning means (312, 313) comprise, on the one hand, means for discretely rotating said at least one reflection means 311 and said at least one source of visible polychromatic light 30, respectively, about an axis, and, on the other hand, means for continuously rotating said at least one reflection means 311 and said at least one source of visible polychromatic light 30, respectively, about said axis.

Such means for rotating can then be designed to ensure a discrete rotation (and thus ensure illumination from a plurality of discrete angles of incidence) or a continuous rotation (and thus ensure illumination from a plurality of continuous angles of incidence).

According to a second type of embodiment, the means for illuminating 31 the medium M along at least two different optical paths comprise means for illuminating 31 the medium M with at least two different illumination foci.

According to a particular embodiment of this second embodiment, the means for illuminating 31 the medium M with at least two different illumination foci may comprise at least two conveying elements (310, 310'), on the one hand, which are configured to convey said at least one visible polychromatic light (emitted by said at least one source of visible polychromatic light 30) and, on the other hand, which are designed to illuminate the medium M with said at least one visible polychromatic light with at least two different illumination foci.

As mentioned above, said detection facility 1 comprises excitation means 4 which are configured to excite the medium M with visible-light or infrared monochromatic radiation.

These excitation means 4 can then also comprise means for exciting 41 the medium M along at least two different optical paths.

In this respect, it will be noted that, according to a first type of embodiment, the means for exciting 41 the medium M along at least two different optical paths comprise means for exciting 41 the medium M according to at least two different excitation angles of incidence.

According to a first embodiment of this first type of embodiment shown in FIG. 1, such means for exciting 41 the medium M along at least two different excitation angles of incidence comprise at least two conveying elements (410, 410'), on the one hand, which are configured to convey said at least one visible-light or infrared monochromatic radiation (emitted by said at least one source of visible-light or infrared monochromatic radiation 40) and, on the other hand, which are arranged to excite the medium M with said at least one visible-light or infrared monochromatic radiation along at least two different excitation angles of incidence.

In fact, said at least two conveying elements (410, 410') can adopt at least two different positions and/or at least two different orientations.

According to a second embodiment of this first type of embodiment shown in FIG. 2, the means for exciting 41 the medium M along at least two different excitation angles of incidence comprise, on the one hand, at least one reflection means 411 which is configured to reflect said at least one visible-light or infrared monochromatic radiation (emitted by said at least one source of visible-light or infrared monochromatic radiation 40) in the direction of the medium M and, on the other hand, furthermore, positioning means 412 which are configured to position said at least one reflection means 411 in at least two different positions. Such a positioning in at least two different positions then allows the medium M to be excited along at least two different excitation angles of incidence.

According to a third embodiment of this first type of embodiment shown in FIG. 3, the means for exciting 41 the medium M along at least two different excitation angles of incidence comprise positioning means 413 which are configured to position said at least one source of visible-light or infrared monochromatic radiation 40, in at least two different positions. Once again, such a positioning in at least two different positions then allows the medium M to be excited along at least two different excitation angles of incidence.

Such positioning means (412; 413) advantageously make it possible to substantially increase the number of optical excitation paths.

It will be noted that the positioning means (412, 413) comprise, on the one hand, means for discretely rotating said at least one reflection means 411 and said at least one source of visible-light or infrared monochromatic radiation 40, respectively, about an axis, and, on the other hand, means for continuously rotating said at least one reflection means 411 and said at least one source of visible-light or infrared monochromatic radiation 40, respectively, about said axis.

Such means for rotating can once again be designed to ensure a discrete rotation (and thus ensure excitation from a plurality of discrete angles of incidence) or a continuous rotation (and thus ensure excitation from a plurality of continuous angles of incidence).

According to a second type of embodiment, the means for exciting 41 the medium M along at least two different optical paths comprise means for exciting 41 the medium M with at least two different excitation foci.

According to a first embodiment of this second type of embodiment, the means for exciting 41 the medium M along at least two different excitation foci may comprise at least two conveying elements (410, 410'), on the one hand, which are configured to convey said at least one visible-light or infrared monochromatic radiation (emitted by said at least one source of visible-light or infrared monochromatic radiation 40) and, on the other hand, which are designed to excite the medium M with said at least one visible-light or infrared monochromatic radiation with at least two different excitation foci.

The aforementioned conveying elements (310, 310', 410, 410') may each comprise or consist of an optical fiber.

As mentioned above, said detection facility 1 comprises first means for collecting and conveying 5 at least a first electromagnetic radiation emitted by the medium M.

According to an additional feature, these first collection and conveying means 5 can then comprise means for collecting 50 said at least one first electromagnetic radiation, along at least two different optical paths.

In this respect, it will be noted that, according to a first type of embodiment, the means for collecting 50 said at least one first electromagnetic radiation along at least two different optical paths comprise means for collecting 50 said at least one first electromagnetic radiation along at least two different collection angles of incidence.

According to a particular embodiment, the means for collecting 50 said at least one first electromagnetic radiation along at least two different collection angles of incidence comprise at least two collecting and conveying elements 51 which are arranged to collect said at least one first electromagnetic radiation along at least two different collection angles of incidence. In fact, said at least two collecting and conveying elements 51 preferably adopt at least two different positions and/or at least two different orientations.

According to another embodiment, the means for collecting 50 said at least one first electromagnetic radiation along at least two different collection angles of incidence comprise, on the one hand, at least one reflection means which is configured to reflect said at least one first electromagnetic radiation emitted by the medium M and, on the other hand, also, positioning means which are configured to position said at least one reflection means in at least two different positions. Such a positioning in at least two different positions then allows a collection along at least two different collection angles of incidence.

According to yet another embodiment, the means for collecting 50 said at least one first electromagnetic radiation along at least two different collection angles of incidence comprise positioning means which are configured to position at least one collecting and conveying element, in at least two different positions. Once again, such a positioning in at least two different positions then allows a collection along at least two different collection angles of incidence.

Such positioning means advantageously make it possible to substantially increase the number of optical collection paths for said at least one first electromagnetic radiation.

It will be noted that the positioning means comprise, on the one hand, means for discretely rotating said at least one reflection means and said at least one collecting and conveying element, respectively, about an axis, and, on the other hand, means for continuously rotating said at least one reflection means and said at least one collecting and conveying element, respectively, about said axis.

Such means for rotating can once again be designed to ensure a discrete rotation (and thus ensure collection from a plurality of discrete angles of incidence) or a continuous rotation (and thus ensure collection from a plurality of continuous angles of incidence).

According to a second type of embodiment, the means for collecting 50 said at least one first electromagnetic radiation along at least two different optical paths comprise means for collecting 50 said at least one first electromagnetic radiation with at least two different collection foci.

According to a particular embodiment, the means for collecting 50 said at least one first electromagnetic radiation with at least two different collection foci comprise at least two collecting and conveying elements 51 which are configured to collect said at least one first electromagnetic radiation with at least two different collection foci.

As mentioned above, said detection facility 1 further comprises second means for collecting and conveying 6 at least a second electromagnetic radiation emitted by the medium M.

According to an additional feature, these second collection and conveying means 6 can then comprise means for collecting 60 said at least one second electromagnetic radiation, along at least two different optical paths.

In this respect, it will be noted that, according to a first type of embodiment, the means for collecting 60 said at least one second electromagnetic radiation along at least two different optical paths comprise means for collecting 60 said at least one second electromagnetic radiation along at least two different collection angles of incidence.

According to a particular embodiment, the means for collecting 60 said at least one second electromagnetic radiation along at least two different collection angles of incidence comprise at least two collecting and conveying elements 61 which are arranged to collect said at least one second electromagnetic radiation along at least two different collection angles of incidence. In fact, said at least two collecting and conveying elements 61 preferably adopt at least two different positions and/or at least two different orientations.

According to another embodiment, the means for collecting 60 said at least one second electromagnetic radiation along at least two different collection angles of incidence comprise, on the one hand, at least one reflection means which is configured to reflect said at least one second electromagnetic radiation emitted by the medium M and, on the other hand, also, positioning means which are configured to position said at least one reflection means in at least two different positions. Such a positioning in at least two different positions then allows a collection along at least two different collection angles of incidence.

According to yet another embodiment, the means for collecting 60 said at least one second electromagnetic radiation along at least two different collection angles of incidence comprise positioning means which are configured to position at least one collecting and conveying element, in at least two different positions. Once again, such a positioning in at least two different positions then allows a collection along at least two different collection angles of incidence.

Such positioning means advantageously make it possible to substantially increase the number of optical collection paths for said at least one second electromagnetic radiation.

It will be noted that the positioning means comprise, on the one hand, means for discretely rotating said at least one reflection means and said at least one collecting and conveying element, respectively, about an axis, and, on the other hand, means for rotating said at least one reflection means and said at least one collecting and conveying element, respectively, about said axis.

Once again, such means for rotating can be designed to ensure a discrete rotation (and thus ensure collection from a plurality of discrete angles of incidence) or a continuous rotation (and thus ensure collection from a plurality of continuous angles of incidence).

According to a second type of embodiment, the means for collecting 60 said at least one second electromagnetic radiation along at least two different optical paths comprise means for collecting 60 said at least one second electromagnetic radiation with at least two different collection foci.

According to a particular embodiment, the means for collecting 60 said at least one second electromagnetic radiation with at least two different collection foci comprise at least two collecting and conveying elements 61 which are configured to collect said at least one second electromagnetic radiation with at least two different collection foci.

The means 5 for collecting and conveying said at least one first electromagnetic radiation and/or the means 6 for collecting and conveying said at least one second electromagnetic radiation can each comprise or consist of at least one optical fiber.

In particular, said at least one collecting and conveying element (51; 61) may each comprise or consist of at least one optical fiber.

According to another feature of the invention, the detection facility 1 may comprise at least one illumination probe that comprises at least part of the illumination means 3, more particularly at least the means for illuminating 31 the medium M along at least two different optical paths, in particular at least the means for illuminating 31 the medium M along at least two different illumination angles of incidence, or even said at least one source of visible polychromatic light 30 as described above.

Such an illumination probe can then comprise said at least two conveying elements (310, 310') which are configured to convey said at least one visible polychromatic light, as described above.

Alternatively, this illumination probe can comprise said positioning means (312; 313) as well as, depending on the case, said at least one reflection means 311 or said at least one source of visible polychromatic light 30 as described above.

Additionally, the detection facility 1 may comprise at least one excitation probe that comprises at least part of the excitation means 4, more particularly at least the means for exciting 41 the medium M along at least two different optical paths, in particular at least the means for exciting 41 the medium M along at least two different excitation angles of incidence, or even said at least one source of visible-light or infrared monochromatic radiation 40 as described above.

Such an excitation probe can then comprise said at least two conveying elements (410, 410') which are configured to convey said at least one visible-light or infrared monochromatic radiation, as described above.

Alternatively, this excitation probe can comprise said positioning means (412; 413) as well as, depending on the case, said at least one reflection means 411 or said at least one source of visible-light or infrared monochromatic radiation 40 as described above.

However, and according to one particular embodiment, said detection facility 1 can comprise at least one illumination and excitation probe 10 which comprises, on the one hand, at least part of the illumination means 3, in particular at least the means for illuminating 31 the medium M along at least two different optical paths as described above (more particularly said at least two conveying elements 310; 310' configured to convey said at least one visible polychromatic light), or also said at least one source of visible polychromatic light 30.

On the other hand, this illumination and excitation probe 10 comprises at least part of the excitation means 4, in particular at least the means for exciting 41 the medium M along at least two different optical paths as described above (more particularly said at least two conveying elements 410; 410' configured to convey said at least one visible-light or infrared monochromatic radiation), or also said at least one source of visible-light or infrared monochromatic radiation 40.

In particular, said at least one illumination and excitation probe 10 comprises said means for illuminating 31 the medium M along at least two different optical paths as described above, more particularly said means for illuminating 31 the medium M along at least two different illumination angles of incidence, in particular said at least two conveying elements 310, 310' configured to convey said at least one visible polychromatic light or said positioning means (312; 313) as well as, according to the case, said at least one reflection means 311 and/or said at least one source of visible polychromatic light 30 as described above.

Alternatively, or (and preferably) additionally (as shown in FIG. 1), said at least one illumination and excitation probe 10 comprises said means for exciting 41 the medium M along at least two different optical paths as described above, more particularly said means for exciting 41 the medium M along at least two different excitation angles of incidence, in particular said at least two conveying elements 410; 410' configured to convey said at least one monochromatic radiation into visible or infrared light or said positioning means (412; 413) as described above, said at least one reflection means 411 and/or said at least one source of visible-light or infrared monochromatic radiation 40 as described above.

According to another feature, the detection facility 1 may further comprise at least one collection probe 11 that comprises the means for collecting 50 said at least one first electromagnetic radiation along at least two different optical paths as described above.

Alternatively, or (and preferably) additionally (as shown in FIG. 1) said at least one collection probe 11 comprises the means for collecting 60 said at least one second electromagnetic radiation along at least two different optical paths as described above.

Such a collection probe 11 can then comprise said at least two collecting and conveying elements 51 arranged to collect said at least one first electromagnetic radiation along at least two different collection angles of incidence and/or said at least two collecting and conveying elements 61 arranged to collect said at least one second electromagnetic radiation along at least two different collection angles of incidence as described above.

Such a collection probe 11 may also comprise the positioning means as well as, depending on the case, said at least one reflection means and/or said at least one conveying and conveying element as described above.

Alternatively, or additionally, such a collection probe 11 may comprise said at least two collecting and conveying elements 51 configured to collect said at least one first electromagnetic radiation with at least two different collection foci and/or said at least two collecting and conveying elements 61 arranged to collect said at least one second electromagnetic radiation configured to collect said at least one first electromagnetic radiation with at least two different collection foci.

Finally, and according to one particular embodiment, the detection facility 1 comprises at least one illumination, excitation, and collection probe 12 which comprises at least part of the illumination means 3, at least part of the excitation means 4, at least part of the first collecting and conveying means 5 as well as at least part of the second collecting and conveying means 6 as described above.

Such an illumination, excitation, and collection probe 12 can then comprise the means for illuminating 31 the medium M along at least two different optical paths (more particularly as described above, in particular said at least two conveying elements 310, 310').

Figure 4:
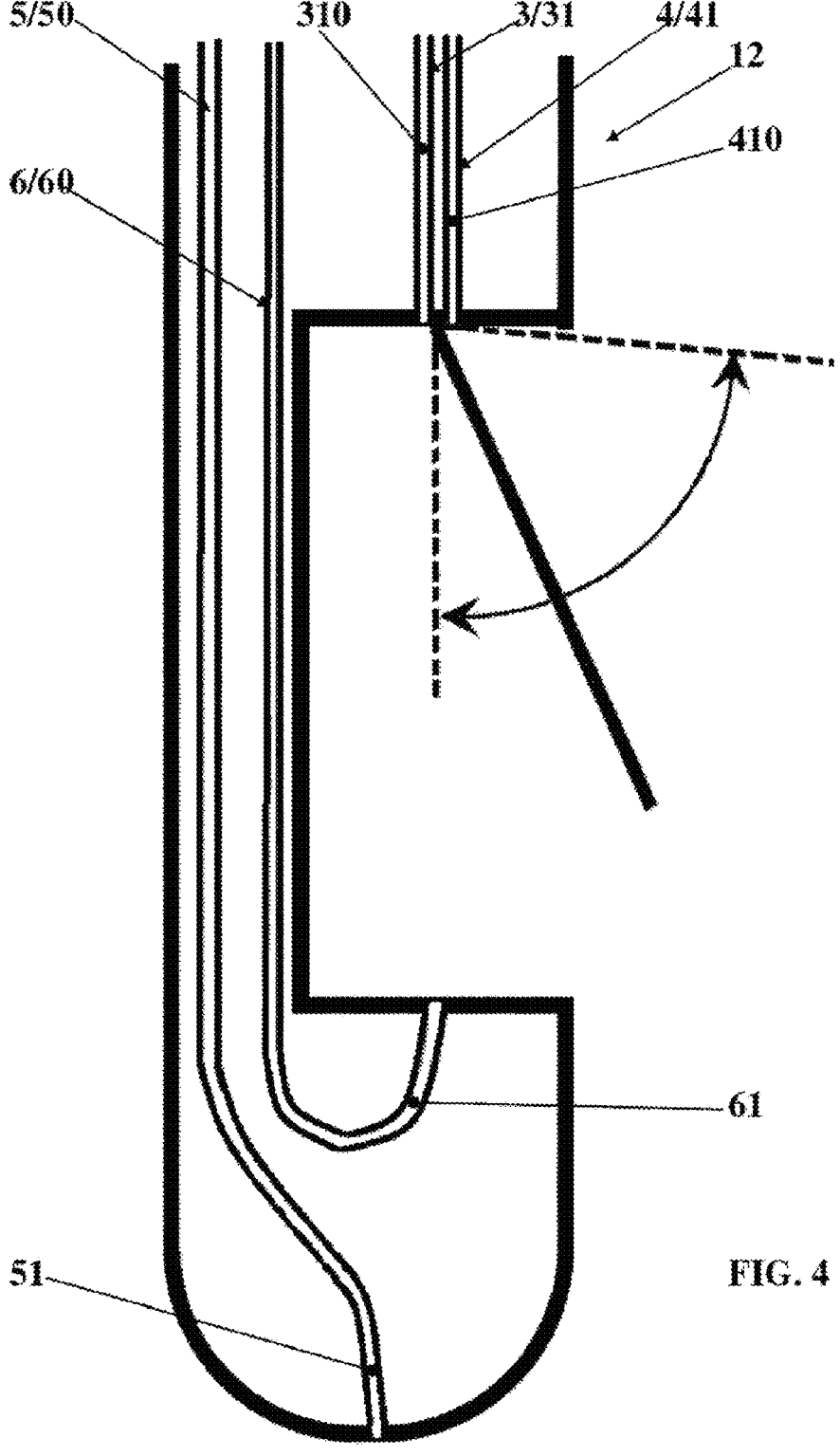
FIG. 4 is a schematic, partial cross-sectional view of an illumination, excitation and collection probe comprised in a facility according to the invention, and which is according to a first embodiment.
Figure 5:
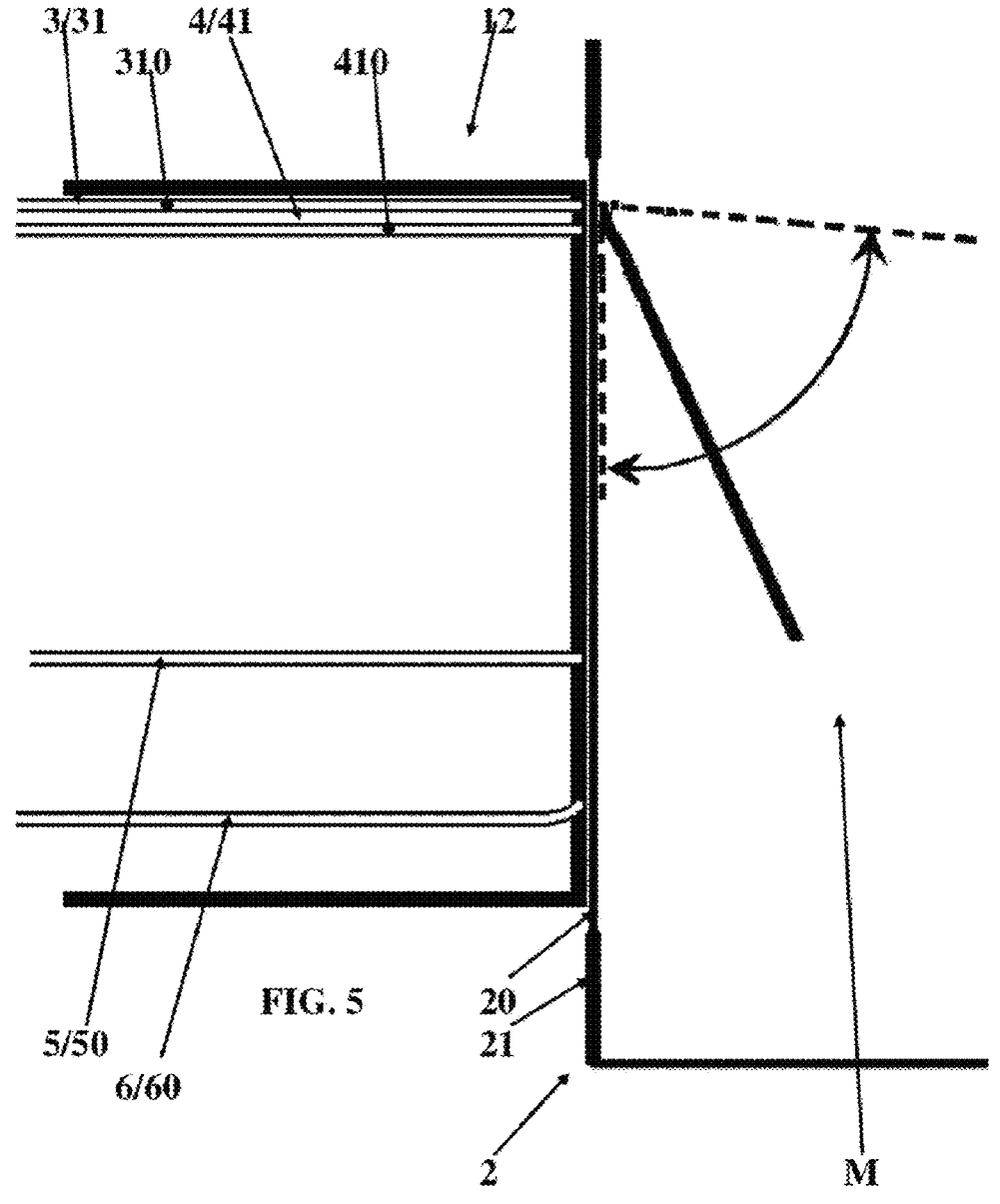
FIG. 5 is a schematic, partial cross-sectional view of an illumination, excitation and collection probe comprised in a facility according to the invention, and which is according to a second embodiment.

Alternatively, or (and preferably) additionally (FIGS. 4 and 5), such an illumination, excitation, and collection probe 12 may comprise the means for exciting 41 the medium M along at least two different optical paths (more particularly as described above, in particular said at least two conveying elements 410, 410').

Alternatively, or (and preferably) additionally (FIGS. 4 and 5), such an illumination, excitation, and collection probe 12 may comprise the means for collecting 50 said at least one first electromagnetic radiation along at least two different optical paths (more particularly as described above, in particular said at least two collecting and conveying elements 51).

Alternatively, or (and preferably) additionally (FIGS. 4 and 5), such an illumination, excitation, and collection probe 12 may comprise the means for collecting 60 said at least one second electromagnetic radiation along at least two different optical paths (more particularly as described above, in particular said at least two collecting and conveying elements 61).

According to another feature, the illumination probe and/or the excitation probe and/or the illumination and excitation probe 10 and/or the collection probe 11 and/or the illumination, excitation and collection probe 12 is positioned at least partially inside the container.

Alternatively, the illumination probe and/or the excitation probe and/or the illumination and excitation probe 10 and/or the collection probe 11 and/or the illumination, excitation and collection probe 12 is positioned at least partially outside the container, more particularly facing a transparent portion 20 of a wall 21 of the container 2, or even applies against such a transparent portion 20 of wall 21, in particular a flat portion.

In this respect, it will be noted that, on the one hand, the transparent portion 20 of the wall 21 of the container 2 can then have a flat surface and, on the other hand, the probe has a flat surface and is applied against the flat surface of this transparent portion 20 of the wall 21 of the container 2.

As mentioned above, the detection facility 1 comprises means 9 for detecting said at least one characteristic parameter, from said at least one visible-band spectrum of the medium M and from said at least one Raman spectrum of the medium M.

Such detection means 9 comprise, on the one hand, a database.

This database contains a plurality of visible-band spectra.

Such a reference visible-band spectrum corresponds to a visible-band spectrum of a reference medium (which has a known characteristic parameter) which is obtained by a visible-band spectrometer, based on at least one electromagnetic radiation, which is emitted by the reference medium which has a known reference characteristic parameter, and which is collected.

This database also contains a plurality of reference Raman spectra.

Such a reference Raman spectrum corresponds to a Raman spectrum of a reference medium (which has a known characteristic parameter) which is obtained by a Raman spectrometer, based on at least one electromagnetic radiation, which is emitted by the reference medium which has a known reference characteristic parameter, and which is collected.

Furthermore, these detection means 9 comprise processing means which are configured to simultaneously process said at least one visible-band spectrum of the medium M and said at least one Raman spectrum of the medium M as a function of the plurality of reference visible-band spectra and the plurality of reference Raman spectra contained in the database, in order to obtain said at least one characteristic parameter of the medium M.

Such processing means comprise software. This software implements an algorithm which is preferably a partial least square (PLS) regression algorithm.

The present invention also relates to an illumination probe and/or an excitation probe and/or an illumination and excitation probe 10 and/or a collection probe 11 and/or an illumination, excitation and collection probe 12. Such a probe has at least some of the features described above.

The present invention also relates to a method for detecting at least one characteristic parameter of a medium M. This method may, in particular, be implemented by a detection facility 1 which has at least some of the features described above.

This detection method comprises the steps of:

illuminating the medium M with visible polychromatic light;

exciting the medium M with visible-light or infrared monochromatic radiation;

collecting and conveying at least a first electromagnetic radiation emitted by the medium M;

collecting and conveying at least a second electromagnetic radiation emitted by the medium M;

obtaining at least one visible-band spectrum of the medium M from said at least one first electromagnetic radiation;

obtaining at least one Raman spectrum of the medium M from said at least one second electromagnetic radiation;

detecting said at least one characteristic parameter of the medium M, from said at least one visible-band spectrum of the medium and from said at least one Raman spectrum of the medium M.

As mentioned above, a step of the detection method relates to a step of illuminating the medium M with a visible polychromatic light. Such an illumination step can be implemented via illumination means 3 mentioned above.

In addition, this step of illuminating the medium M with visible polychromatic light preferably comprises a step of illuminating the medium M along at least two different optical paths.

In fact, such a step of illuminating the medium M along at least two different optical paths may comprise a step of illuminating the medium M, either along at least two different illumination angles of incidence, or with at least two different illumination foci.

Such a step of illuminating the medium M can then, more particularly, be implemented via illumination means 31 described above.

As mentioned above, another step of the detection method relates to a step of exciting the medium M with visible-light or infrared monochromatic radiation. Such an excitation step can be implemented via excitation means 4 mentioned above.

In addition, this step of exciting the medium M with visible-light or infrared monochromatic radiation preferably comprises a step of exciting the medium M along at least two different optical paths.

In fact, such a step of exciting the medium M along at least two different optical paths may comprise a step of exciting the medium M, either along at least two different excitation angles of incidence, or with at least two different excitation foci.

Such a step of exciting the medium M can then, more particularly, be implemented via excitation means 41 described above.

As mentioned above, yet another step of the detection method relates to a step of collecting and conveying at least a first electromagnetic radiation emitted by the medium M. Such a step can be implemented via the first collection and conveying means 5 mentioned above.

In addition, this step of collecting and conveying at least a first electromagnetic radiation emitted by the medium M preferably comprises a step of collecting at least a first electromagnetic radiation along at least two different optical paths.

In fact, such a step of collecting at least a first electromagnetic radiation along at least two different optical paths may comprise a step of collecting at least a first electromagnetic radiation, either along at least two different collection angles of incidence, or with at least two different collection foci.

Such a collection step can then, more particularly, be implemented via means for collecting 50 said at least one first electromagnetic radiation described above.

As mentioned above, another step of the detection method relates to a step of collecting and conveying at least a second electromagnetic radiation emitted by the medium M. Such a step can be implemented via the second collection and conveying means 6 mentioned above.

In addition, this step of collecting and conveying at least a second electromagnetic radiation emitted by the medium M preferably comprises a step of collecting at least a second electromagnetic radiation along at least two different optical paths.

In fact, such a step of collecting at least a second electromagnetic radiation along at least two different optical paths may comprise a step of collecting at least a second electromagnetic radiation, either along at least two different collection angles of incidence, or with at least two different collection foci.

Such a collection step can then, more particularly, be implemented via means for collecting 60 said at least one second electromagnetic radiation described above.

As mentioned above, another step of the detection method relates to a step of detecting said at least one characteristic parameter of the medium M. Such a step can be implemented via the detection means 9 mentioned above.

Furthermore, this detection step comprises a step of simultaneously processing said at least one visible-band spectrum of the medium M and said at least one visible Raman spectrum of the medium M, as a function of a plurality of reference visible-band spectra and a plurality of reference Raman spectra previously recorded in a database (more particularly recorded before the implementation of the detection method and/or during a learning step), in order to obtain said at least one characteristic parameter of the medium M.

As described above, such a reference visible-band (respectively Raman) spectrum corresponds to a visible-band spectrum of a reference medium (which has a known characteristic parameter) which is obtained by a visible-band (respectively Raman) spectrometer, based on at least one electromagnetic radiation, which is emitted by the reference medium which has a known reference characteristic parameter, and which is collected.

Said processing step is, more particularly, implemented by the processing means mentioned above. In particular, this processing step can be implemented by software, in particular software which implements algorithm which is preferably a partial least square (PLS) regression algorithm.

As mentioned above, the invention relates to a facility for detecting at least one characteristic parameter of a medium M.

The invention also relates to a facility for detecting such a characteristic parameter of a medium M.

In this respect, it will be observed that such a medium M can be a culture medium in a bioreactor inside which a biological or biochemical culture process is taking place. The characteristic parameter of this medium M can then be the presence or the quantity of at least one nutrient, the presence or the amount of at least one metabolite, the presence, the amount or the state of at least one microorganism.

Alternatively, the medium M may also be a fermentation medium inside which a biological fermentation process is taking place. The characteristic parameter of this medium M can then be a product of the metabolism, more particularly the content of sugar (in particular the glucose content) or the content of alcohol (in particular the ethanol content). The method and the facility according to the invention then advantageously make it possible to obtain such a characteristic parameter with an accuracy on the order of one gram per liter.

Also alternatively, the medium M may also be a production medium inside which a chemical or biochemical process for producing a product, in particular a pharmaceutical or food product, is taking place. The characteristic parameter can then be the quantity of product, in particular a pharmaceutical or food product, manufactured.

The invention claimed is:

1. A facility for detecting at least one characteristic parameter of a medium, the detection facility comprising:

at least one container to contain the medium;

illumination means configured to illuminate the medium with visible polychromatic light;

excitation means configured to excite the medium with a visible-light or infrared monochromatic radiation;

first collection and conveying means configured to collect and convey at least a first electromagnetic radiation emitted by the medium, and second collection and conveying means configured to collect and convey at least a second electromagnetic radiation emitted by the medium;

at least one visible-band spectrometer connected to the first collection and conveying means and configured to obtain at least one visible-band spectrum of the medium from the at least one first electromagnetic radiation;

at least one Raman spectrometer connected to the second collection and conveying means and configured to obtain at least one Raman spectrum of the medium from the at least one second electromagnetic radiation;

means for detecting the at least one characteristic parameter of the medium, from the at least one visible-band spectrum of the medium and from the at least one Raman spectrum of the medium, wherein the detection means comprise (i) a database containing a plurality of reference visible-band spectra and a plurality of reference Raman spectra, and (ii) processing means configured to process, simultaneously, the at least one visible-band spectrum of the medium and the at least one Raman spectrum of the medium as a function of the plurality of reference visible-band spectra and the plurality of reference Raman spectra of the database, in order to obtain the at least one characteristic parameter of the medium, wherein the illumination means comprise (i) at least one source of visible polychromatic light configured to emit at least one visible polychromatic light, and (ii) means for illuminating the medium along at least two different optical paths, and the excitation means comprise (i) at least one source of visible-light or infrared monochromatic radiation configured to emit at least one visible-light or infrared monochromatic radiation, and (ii) means for exciting the medium along at least two different optical paths;

wherein the means for illuminating the medium along at least two different optical paths comprise means for illuminating the medium along at least two different illumination angles of incidence or with at least two different illumination foci, and the means for exciting the medium along the at least two different optical paths comprise means for exciting the medium along at least two different excitation angles of incidence or with at least two different excitation foci, wherein (i)

the means for illuminating along at least two different illumination angles of incidence comprise at least one first reflection means configured to reflect the at least one visible polychromatic light in direction of the medium and first positioning means configured to position the at least one first reflection means in at least two different positions, and the means for exciting along at least two different excitation angles of incidence comprise at least one second reflection means configured to reflect the at least one visible-light or infrared monochromatic radiation in direction of the medium and second positioning means configured to position the at least one second reflection means in at least two different positions, and/or (ii)

the means for illuminating along at least two different illumination angles of incidence comprise first positioning means configured to position the at least one source of visible polychromatic light in at least two different positions, and the means for exciting along at least two different excitation angles of incidence comprise second positioning means configured to position the at least one source of visible-light or infrared monochromatic radiation in at least two different positions.

2. The detection facility according to claim 1, wherein the first collection and conveying means comprise means for collecting the at least one first electromagnetic radiation along at least two different optical paths, and the second collection and conveying means comprise means for collecting the at least one second electromagnetic radiation along at least two different optical paths.

3. The detection facility according to claim 1, wherein the means for illuminating the medium along at least two different illumination angles of incidence comprise at least two first conveying elements configured to convey the at least one visible polychromatic light and arranged to illuminate the medium with the at least one visible polychromatic light along the at least two different illumination angles of incidence, and the means for exciting the medium along at least two different excitation angles of incidence comprise at least two second conveying elements configured to convey the at least one visible-light or infrared monochromatic radiation and arranged to excite the medium with the at least one visible-light or infrared monochromatic radiation along the at least two different excitation angles of incidence.

4. The detection facility according to claim 3, wherein the at least two first conveying elements are able to adopt at least two different positions and/or at least two different orientations, and the at least two second conveying elements are able to adopt at least two different positions and/or at least two different orientations.

5. The detection facility according to claim 1, wherein the means for illuminating along at least two different illumination angles of incidence comprise at least one first reflection means configured to reflect the at least one visible polychromatic light in direction of the medium and first positioning means configured to position the at least one first reflection means in at least two different positions, and the means for exciting along at least two different excitation angles of incidence comprise at least one second reflection means configured to reflect the at least one visible-light or infrared monochromatic radiation in direction of the medium and second positioning means configured to position the at least one second reflection means in at least two different positions.

6. The detection facility according to claim 1, wherein the means for illuminating along at least two different illumination angles of incidence comprise first positioning means configured to position the at least one source of visible polychromatic light in at least two different positions, and the means for exciting along at least two different excitation angles of incidence comprise second positioning means configured to position the at least one source of visible-light or infrared monochromatic radiation in at least two different positions.

7. The detection facility according to claim 5, wherein the first positioning means comprise (i) first means for discretely rotating about an axis the at least one first reflection means and the at least one source of visible polychromatic light, and (ii) first means for continuously rotating about the axis the at least one first reflection means and the at least one source of visible polychromatic light, and the second positioning means comprise (i) second means for rotating about an axis the at least one second reflection means and the at least one source of visible-light or infrared monochromatic radiation, and (ii) second means for rotating about the axis the at least one second reflection means and the at least one source of visible-light or infrared monochromatic radiation.

8. The detection facility according to claim 1, wherein the means for illuminating the medium along the at least two different optical paths are means for illuminating the medium with at least two different illumination foci, and the means for exciting the medium along the at least two different optical paths are means for exciting the medium with at least two different excitation foci, the means for illuminating the medium with at least two different illumination foci comprise at least two first conveying elements configured to convey the at least one visible polychromatic light, and designed to illuminate the medium with the at least one visible polychromatic light along with at least two different illumination foci, the means for exciting the medium with at least two different excitation foci comprise at least two second conveying elements configured to convey the at least one visible-light or infrared monochromatic radiation and designed to excite the medium with the at least one visible-light or infrared monochromatic radiation with at least two different excitation foci.

9. The detection facility according to claim 2, wherein the means for collecting the at least one electromagnetic radiation along at least two different optical paths are means for collecting the at least one electromagnetic radiation along at least two different collection angles of incidence, and comprise at least two first collecting and conveying elements arranged to collect the at least one electromagnetic radiation along at least two different collection angles of incidence, or the means for collecting the at least one electromagnetic radiation along at least two different optical paths are means for collecting the at least one electromagnetic radiation with at least two different collection foci, and comprise at least two second collecting and conveying elements arranged to collect the at least one electromagnetic radiation with at least two different collection foci.

10. The detection facility according to claim 9, wherein the at least two first collecting and conveying elements or the at least two second collecting and conveying elements are able to adopt at least two different positions and/or at least two different orientations.

11. The detection facility according to claim 1, comprising at least one illumination and excitation probe which comprises at least part of the illumination means and at least part of the excitation means.

12. The detection facility according to claim 11, wherein the at least one illumination and excitation probe comprises the means for illuminating the medium along at least two different optical paths and/or the means for exciting the medium along at least two different optical paths.

13. The detection facility according to claim 2, comprising at least one collection probe which comprises the first means for collecting the at least one first electromagnetic radiation along at least two different optical paths and/or the second means for collecting the at least one second electromagnetic radiation along at least two different optical paths.

14. The detection facility according to claim 1, comprising at least one illumination, excitation, and collection probe which comprises at least part of the illumination means, at least part of the excitation means, at least part of the first collection and conveying means, and at least part of the second collection and conveying means.

15. A method for detecting at least one characteristic parameter of a medium, wherein the method is implemented by the detection facility according to claim 1 and comprises:

illuminating the medium with visible polychromatic light;

exciting the medium with visible-light or infrared monochromatic radiation;

collecting and conveying at least a first electromagnetic radiation emitted by the medium;

collecting and conveying at least a second electromagnetic radiation emitted by the medium;

obtaining at least one visible-band spectrum of the medium from the at least one first electromagnetic radiation;

obtaining at least one Raman spectrum of the medium from the at least one second electromagnetic radiation;

detecting the at least one characteristic parameter of the medium, from the at least one visible-band spectrum of the medium and from the at least one Raman spectrum of the medium, comprising simultaneously processing the at least one visible-band spectrum of the medium and the at least one visible Raman spectrum of the medium, as a function of a plurality of reference visible-band spectra and a plurality of reference Raman spectra previously recorded in a database, in order to obtain the at least one characteristic parameter of the medium.

16. The detection method according to claim 15, wherein the illuminating the medium with visible polychromatic light comprises illuminating the medium along at least two different optical paths, and the exciting the medium with visible-light or infrared monochromatic radiation comprises exciting the medium along at least two different optical paths.

17. The detection method according to claim 16, wherein the illuminating the medium along at least two different optical paths comprises illuminating the medium along at least two different illumination angles of incidence or with at least two different illumination foci, and the exciting the medium along at least two different optical paths comprises exciting the medium along at least two different excitation angles of incidence or with at least two different excitation foci.

18. The detection method according to claim 15, wherein the collecting and conveying at least a first electromagnetic radiation emitted by the medium comprises collecting at least a first electromagnetic radiation along at least two different optical paths, and the collecting and conveying at least a second electromagnetic radiation emitted by the medium comprises collecting at least a second electromagnetic radiation along at least two different optical paths.

19. The detection method according to claim 18, wherein the collecting and conveying the at least first electromagnetic radiation emitted by the medium along at least two different optical paths comprises collecting along at least two different collection angles of incidence or with at least two different collection foci, and the collecting and conveying the at least second electromagnetic radiation emitted by the medium along at least two different optical paths comprises collecting along at least two different collection angles of incidence or with at least two different collection foci.

20. The detection method according to claim 15, wherein the medium is a culture medium in a bioreactor inside which a biological or biochemical culture process is taking place, and the at least one characteristic parameter is at least one selected from the group consisting of a presence of at least one nutrient, an amount of at least one nutrient, a presence of at least one metabolite, an amount of at least one metabolite, a presence of at least one microorganism, an amount of at least one microorganism, and a state of at least one microorganism.

21. The detection method according to claim 15, wherein the medium is a fermentation medium inside which a biological fermentation process is taking place, and the at least one characteristic parameter is a product of the fermentation.

22. The detection method according to claim 15, wherein the medium is a production medium inside which a chemical or biochemical process for producing a product is taking place, and the at least one characteristic parameter is a quantity of product manufactured.

\* \* \* \* \*